US006658661B1

(12) United States Patent
Arsenault et al.

(10) Patent No.: US 6,658,661 B1
(45) Date of Patent: Dec. 2, 2003

(54) CAROUSEL BIT MASK SYSTEM AND METHOD

(75) Inventors: Robert G. Arsenault, Redondo Beach, CA (US); Craig A. Finseth, St. Paul, MN (US); Kenneth D. Seibert, Redondo Beach, CA (US); Tam T. Leminh, Cypress, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/515,184

(22) Filed: Feb. 29, 2000

Related U.S. Application Data

(60) Provisional application No. 60/126,916, filed on Mar. 29, 1999.

(51) Int. Cl.[7] .............................................. H04N 5/445
(52) U.S. Cl. ............................ 725/54; 725/39; 725/46
(58) Field of Search ........................... 725/90, 35, 138, 725/140, 142, 37–61, 132, 152

(56) References Cited

U.S. PATENT DOCUMENTS

| 5,038,211 | A | * | 8/1991 | Hallenbeck ................ 358/142 |
| 5,585,838 | A | * | 12/1996 | Lawler et al. ............... 725/54 |
| 5,841,433 | A | * | 11/1998 | Chaney ...................... 345/327 |
| 5,917,481 | A | * | 6/1999 | Rzeszewski et al. ........ 345/327 |
| 6,047,317 | A | * | 4/2000 | Bisdikian et al. ........... 725/142 |
| 6,064,378 | A | * | 5/2000 | Chaney et al. ............... 725/39 |
| 6,160,545 | A | * | 12/2000 | Eyer et al. ................. 345/721 |
| 6,172,674 | B1 | * | 1/2001 | Etheredge .................. 345/327 |
| 6,177,930 | B1 | * | 1/2001 | Chernock et al. ........... 345/327 |
| 6,243,145 | B1 | * | 6/2001 | Schlarb et al. ............. 348/906 |
| 6,341,195 | B1 | * | 1/2002 | Mankovitz et al. ........... 386/83 |
| 6,401,242 | B1 | * | 6/2002 | Eyer et al. .................. 725/35 |
| 6,412,110 | B1 | * | 6/2002 | Schein et al. ................ 725/40 |
| 6,453,471 | B1 | * | 9/2002 | Klosterman ................. 725/41 |
| 6,505,348 | B1 | * | 1/2003 | Knowles et al. ............. 725/49 |
| 6,507,950 | B1 | * | 1/2003 | Tsukidate et al. ............ 725/54 |

* cited by examiner

Primary Examiner—John Miller
Assistant Examiner—Annan Q. Shang
(74) Attorney, Agent, or Firm—John A. Crook; Michael W. Sales

(57) ABSTRACT

In a broadcast system such as a direct-to-home satellite system, program guide information for different time periods is transmitted on different carousels (e.g., one for 0–6 hours from current time, one for 6–24 hours, one for 24–72 hours, etc.) and broadcast on all transponders. Guide information for time periods in the near future is transmitted more frequently (i.e., less information per carousel) than guide information for later time periods. The receiving IRD sets a bit mask to indicate which carousel or carousels it requires and downloads them in serial or parallel. Updated information is never missed because it is given a bit pattern that is never screened by the mask. Further, the IRD can download the program guide information in the background (i.e., while displaying video) because it does not need to tune to a different transponder.

16 Claims, 6 Drawing Sheets

CAROUSEL BIT MASK SYSTEM AND METHOD

RELATED APPLICATIONS

This application claims priority from provisional application Ser. No. 60/126,916, filed Mar. 29, 1999.

TECHNICAL FIELD OF THE INVENTION

The present invention relates in general to scheduling broadcast information and in particular to transmitting electronic television program guide data in a broadcast satellite system.

BACKGROUND OF THE INVENTION

Television signal distribution systems typically broadcast television signals to individual users or subscribers on a plurality of individual television channels. The channels may be modulated onto one or more carrier frequencies within a discernable frequency band. Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

The receiver unit receives and processes transmitted waveforms. The receiver unit in a satellite systems typically includes a satellite dish connected by a cable to an integrated receiver/decoder unit (IRD). The satellite dish is aimed toward the satellite, and the IRD is connected to the user's television in a similar fashion to a conventional cable-TV decoder.

Along with the audio and video signals associated with the television channels, the satellite transmits various digital objects such as text and graphics. These objects may be used by the IRD to provide the user with additional information such as an electronic program guide (e.g., a grid of shows and start times). Typically, digital objects used to construct the electronic program guide are serially loaded from the satellite data stream on demand. In other words, when the user enters a command to view the electronic program guide, and further when the user scrolls within the electronic program guide, the receiver unit waits until the next time the required data is broadcast by the satellite and retrieves it.

This method has certain drawbacks. If the electronic program guide data is not repeated by the satellite very frequently, the user must wait when starting up and scrolling through the electronic program guide. If the electronic program guide data is repeated by the satellite more frequently, it consumes more bandwidth. Further, if program information changes while the user is viewing the electronic program guide (e.g., the time a movie starts changes from 8:00 P.M. to 7:00 P.M.), the user may miss the updated information.

SUMMARY OF THE INVENTION

In accordance with a first aspect of the invention a method for selectively storing an electronic program guide object in a broadcast system is provided. The method begins by setting a bit in a local mask indicative of a carousel of electronic program guide information. When an object mask associated with the electronic program guide object is acquired, it is compared to the local mask. Subsequently, if the electronic program guide object is associated with the carousel of electronic program guide information, the method stores the electronic program guide object.

In some embodiments, the method further comprises the steps of comparing the object mask to a predefined constant, and storing the electronic program guide object if the object mask is equal to the predefined constant. In such an instance, the predefined constant may be equal to a binary number comprising all ones. In certain embodiments, the method further comprises the steps of receiving a marker, comparing the received marker to a predefined marker; and clearing the bit in the local mask if the received marker is equal to the predefined marker. In some embodiments, the method further comprises the step of determining if a received object is an update object, wherein the step of setting the bit in the local mask is performed in response to determining that the received object is an update object. In certain embodiments, the method further comprises the step of determining if a predefined time period has elapsed since last receiving an update object, wherein the step of setting the bit in the local mask is performed in response to determining that the predefined time period has elapsed. In the preferred embodiment, the broadcast system comprises a direct-to-home satellite system, and the step of comparing the object mask to the local mask comprises a logical AND operation.

In accordance with a further aspect of the invention, an apparatus for selectively storing an electronic program guide object in a satellite television system is provided. The apparatus comprises a satellite signal receiver for receiving the electronic program guide object. The apparatus further comprises a memory for storing the electronic program guide object. Still further, the apparatus comprises a control circuit operatively coupled to the receiver and the memory for determining if an object mask associated with the electronic program guide object is indicative of a predefined carousel of electronic program guide information, the control circuit causing the memory to store the electronic program guide object if the object mask is indicative of the predefined carousel.

In some embodiments, the control circuit is further adapted to compare the object mask to a predefined constant. Subsequently, the control circuit may cause the memory to store the electronic program guide object if the object mask is equal to the predefined constant. In certain embodiments, the control circuit is further adapted to compare a marker received by the satellite signal receiver to a predefined marker, wherein the marker is indicative of a particular point in time associated with the carousel of electronic program guide information. In some embodiments, the control circuit is further adapted to determine if an update object is received by the satellite signal receiver.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Figure 1:
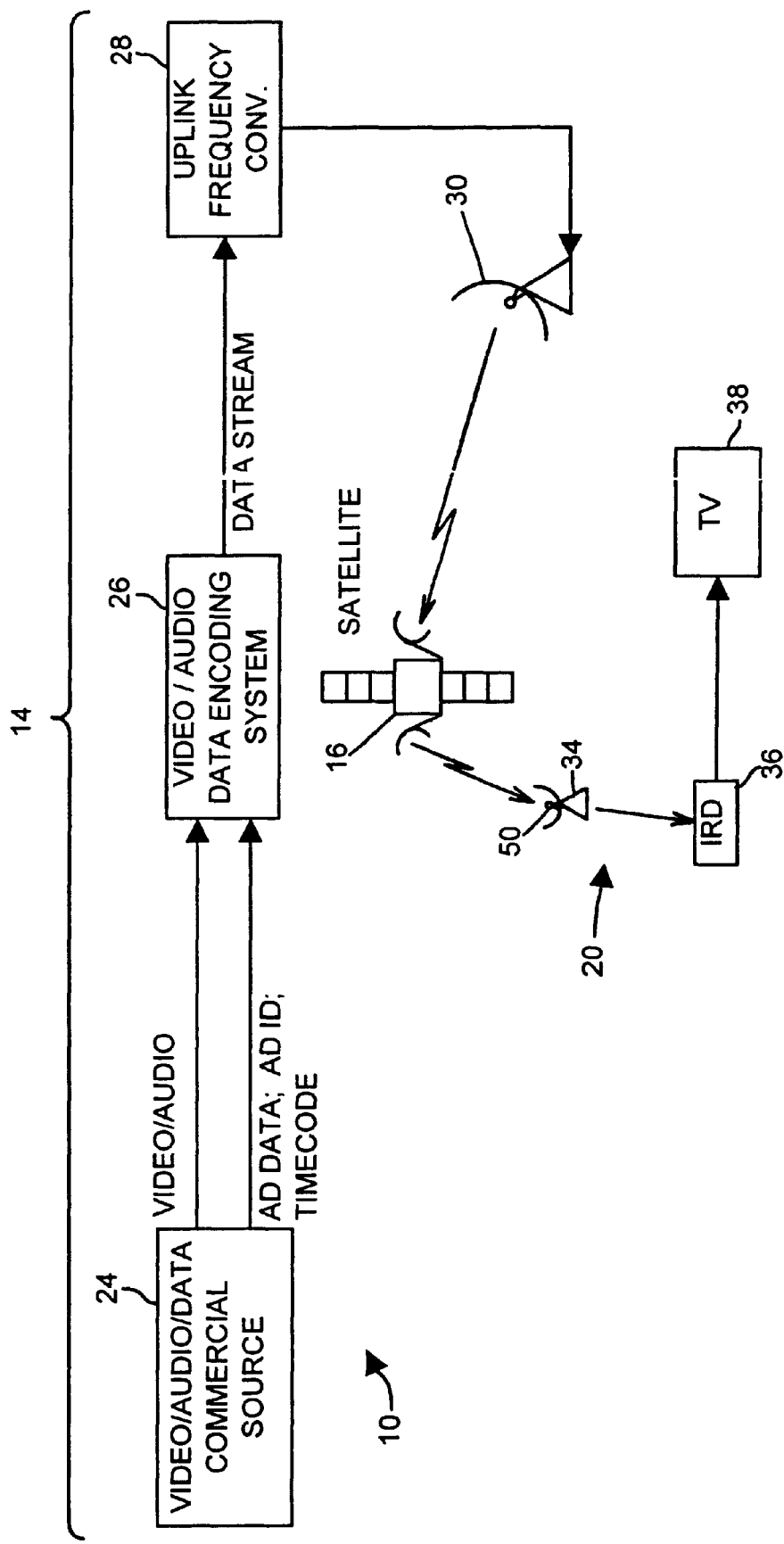
FIG. 1 is a block diagram of a direct broadcast satellite system that implements the method and apparatus of the present invention.

Although the following description focuses on the scheduling and transmission of data for a satellite television program guide, persons of ordinary skill in the art will readily appreciate that the techniques of the present invention are in no way limited to satellite broadcasts or program guides. To the contrary, any system which might benefit from the flexible acquisition of data, improved start-up speed, decreased latency, and/or fewer missed messages may employ the techniques shown herein.

In general, television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

Typically, such systems include a receiver for receiving and processing transmitted waveforms. One type of receiver is part of a "wireless digital television" system utilized by the DIRECTV® broadcast service. It and similar systems allow consumers to receive directly in their homes over 175 television channels broadcast from geosynchronous satellites. The receiver includes a small (e.g., 18-inch) satellite antenna (e.g., reflective dish and LNB) connected by a cable to an integrated receiver/decoder unit (IRD). The satellite antenna is aimed toward the satellites, and the IRD is connected to the user's television in a similar fashion to a conventional cable-TV decoder.

On the transmission side, video, audio, and related information data signals are digitally encoded into a packetized data stream using a number of algorithms, including convolutional error correction. The encoded data stream is then compressed to reduce bandwidth requirements, modulated to Ku-band frequency, transmitted to the satellite, and relayed from the satellite to the satellite antenna. The LNB (low noise block) of the satellite antenna shifts the Ku-band signal down to an L-band signal which is transmitted through the cable to the IRD.

In the IRD, front-end circuitry receives the L-band-signal and converts it to the original digital data stream of video, audio, and related information signals. The digital data stream is fed to video/audio decoder circuits which perform the main video/audio processing functions such as dermultiplexing and decompression. A micro-controller controls the overall operation of the IRD, including the selection of parameters, the set-up and control of components,. channel selection, viewer access to different programming packages, blocking certain channels, and many other functions. The compression and decompression of packetized video and audio signals may be accomplished according to the Motion Picture Expert Group (MPEG) standards for performing digital video/audio compression. Thus, the IRD unit typically includes an MPEG-1 and/or MPEG-2 video/audio decoder in order to decompress the received compressed video/audio.

The present invention is preferably embodied in a wireless distribution system that securely, reliably, and inexpensively distributes digital packetized video, audio, and data to individual users at geographically remote locations. The wireless distribution system is preferably implemented using the uplink and airlink facilities of a digital satellite television distribution system such as the system utilized by the DIRECTV® broadcast service. The present invention relates generally to a method and apparatus for receiving and storing program guide information related to broadcast entertainment-type data, such as packetized digital video, audio, and related information data received in a direct-to-home (DTH) system.

At a satellite uplink facility, video and audio signals may be digitized in known manners, multiplexed with other data signals, compressed (if required), mated with error correction codes, modulated on one or more carriers, and uplinked to a geosynchronous satellite. The satellite amplifies the received signal, shifts the signal to a different carrier frequency band and transmits (downlinks) the frequency shifted signal to earth for reception at individual receiver stations. A plurality of signals at different frequencies and/or polarizations are typically processed. Receiver stations, which are typically located at the user's dwelling, receive the satellite signals. The receiver stations include an antenna, which preferably is in the form of a satellite dish, along with an integrated receiver/decoder (IRD). The antenna feeds the received satellite signal to the IRD unit which recovers the originally transmitted digital video, audio, and data. In the preferred embodiment, the uplink and downlink broadband signals may be divided into a plurality of transponder signals, each having a plurality of individual channels.

Typically, the received packets are presented to a transport circuit that is in communication with a microprocessor. The microprocessor informs the transport circuit about which packets are of interest. For example, if the IR is instructed by the user to display the ESPN station, the microprocessor instructs the transport to receive and process all packets (including particularly the video, audio, and data packets) associated with the ESPN programming. The information about how to receive ESPN, or any other programming channel, is provided via the program guide data stream. In general, the program guide identifies (based on header information) those packets that must be assembled in order to construct the audio, video, and data for any of the available programs. Program guide data may also include information needed to construct a graphical listing of the showtimes and channels for available programming, program description data, program rating data, program category data, and other data. The transport identifies desired ESPN packets by header information in the packet, strips off the payload portion of the packet, and forwards the payloads to an audio/video decoder (or optionally first to an intermediate storage location). The decoder then stores the payloads in designated memory locations. The ESPN video and audio payloads are then called up from their memory locations as needed, decoded, converted to, e.g., NTSC analog or other output signals, or a digital serial or parallel TV signal, and provided to an appropriate output device, such as a television monitor for display.

FIG. 1 is a block diagram of a transmission and reception system 10 embodying features of the present invention. The illustrated system 10 includes a transmission station 14, a relay 16, and a plurality of receiver stations, one of which is shown at reference numeral 20. A wireless airlink provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 is preferably at least one geosynchronous satellite. The receiver station 20 includes a satellite reception antenna 34 which may comprise a low-noise-block (LNB) 50, a receiver unit (or IRD) 36 connected to the LNB 50, and connected to the LNB 50, and a television monitor 38 (or other output device) connected to the receiver unit 36.

In operation, the transmission station 14 can receive video and audio programming from a number of sources, including satellites, terrestrial fiber optics, cable, or tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna 30 where it is broadcast toward the satellite 16 over the airlink. The satellite 16 receives the modulated, encoded Ku-band data stream and re-broadcasts it downward toward an area on earth that includes the various receiver stations 20. The LNB 50 of the satellite antenna 34 of the receiver station 20 shifts the Ku-band signal down to an L-band signal which is transmitted to the receiver unit 36.

Figure 2:
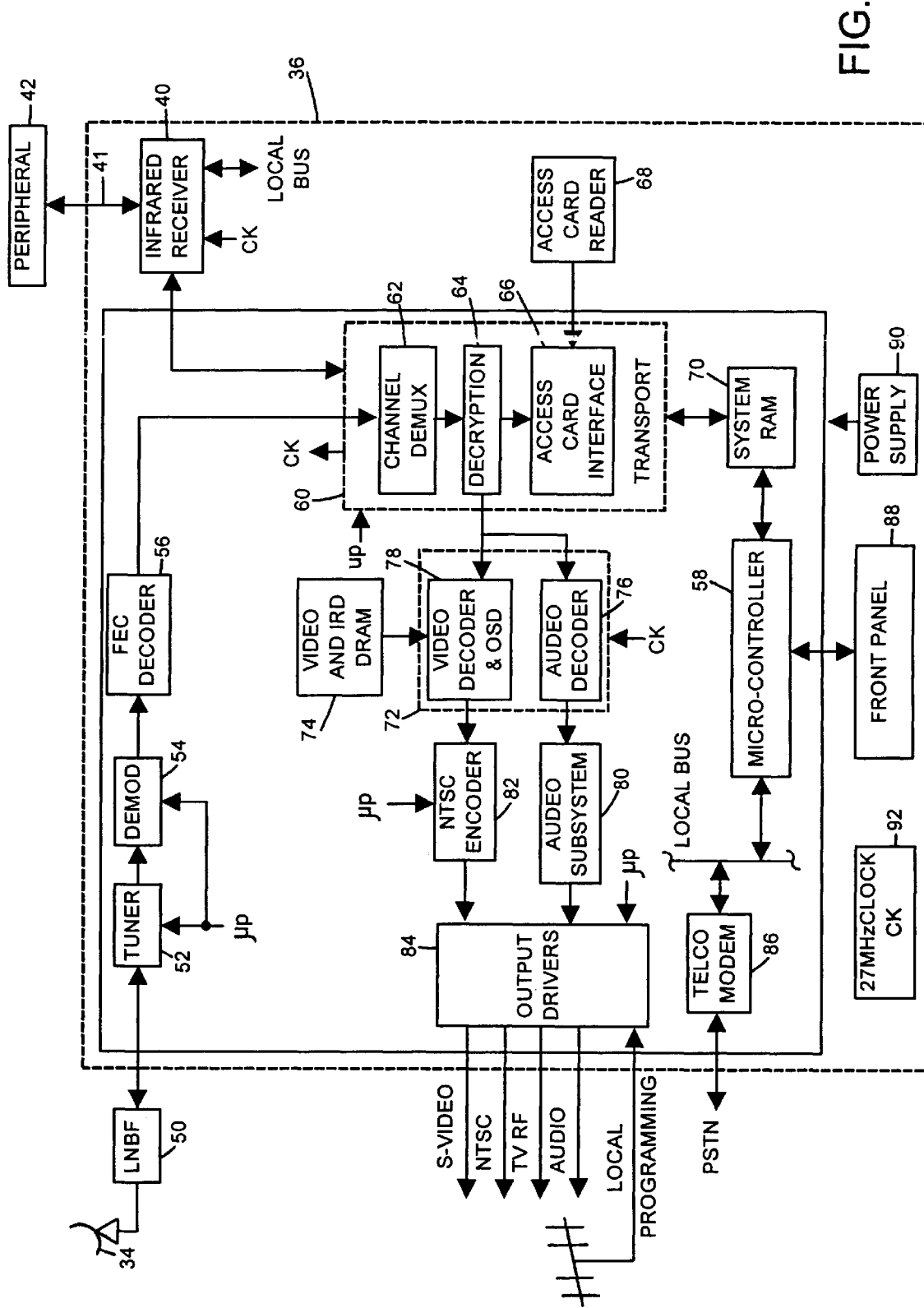
FIG. 2 is a block diagram illustrating more details of the receiver station of FIG. 1 embodying the present invention.

FIG. 2 is a more detailed block diagram of a portion of the receiver unit 36 shown in FIG. 1. Front-end circuitry inside the receiver unit 36 receives the L-band RF signals from the LNB 50 and converts them back into the original digital data stream. Decoding circuitry, receives the original data stream and performs video/audio processing operations such as demultiplexing and decompression. A microprocessor or CPU 58 controls the overall operation of the receiver unit 36, including the selection of parameters, the set-up and control of components, channel selection, and many other functions.

The receiver unit 36 includes a tuner 52, demodulator 54, FEC decoder 56, a micro-controller 58, a transport circuit 60, a channel demultiplexer 62, decryption circuit 64, an access card interface 66, an access card reader 68, a system RAM 70, an audio/video decoder circuit 72 having a random-access-memory (RAM) 74, audio decoder 76, video decoder 78, an audio digital-to-analog circuit 80, an NTSC (or other) encoder 82, output drivers 84, a modem connection 86, a front panel user interface 88, and a power supply 90, coupled together as illustrated. A 27 MHz clock signal generator 92 is also provided. The clock generator 92 generates a clock signal (CK) which is coupled to the audio/video decoder circuit 72 and which is frequency-calibrated by a signal received from the transport circuit 60, as shown.

The transport 60 receives the transport stream of digitized data packets containing video, audio, data, scheduling information, and other data. The digital packet information contains identifying headers as part of its overhead data. Under control of the micro-controller 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity, and generate a code that confirms to the transport 60 that the subject data packet is authorized.

The authorized data of interest, which now consists of the payload portions of the received data packets, are forwarded to decoder DRAM 74 for buffering and may optionally be intermediately stored in system RAM 70. The audio/video decoder 72 decodes the payloads stored in DRAM 74, as needed. The requested data is routed from the RAM 70 through the transport 60 to the audio/video decoder 72. At that time, the data is routed to the video decoder 78 (which includes display generating circuitry) and the NTSC (or other) encoder 64. The video decoder 78 reads in the compressed video data from the DRAM 74, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the DRAM 74. At a later time, the image is read out of the frame buffer in DRAM 74 and passed through the display circuitry to the encoder 82. The display circuitry (located in the video decoder 78) generates the graphics that allow text such as the electronic program guide data to be displayed. The encoder 78 converts the digital video signals to analog according to the NTSC standard or to other desired output protocols (e.g., ATSC), thereby allowing video to be received by a conventional television 38 or other video output device (FIG. 1).

Figure 3:
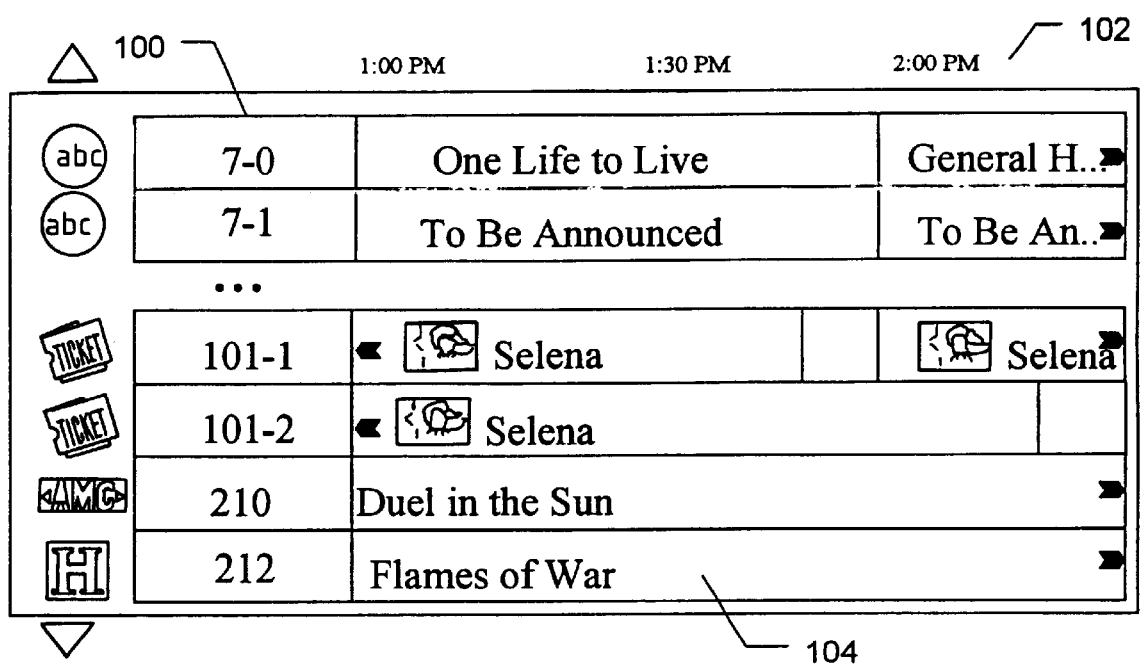
FIG. 3 is a block diagram illustrating a generic example of an electronic television program guide.

Illustrated in FIG. 3 is an example of an electronic program guide. Typically, channels 100 are listed in, e.g., numeric order vertically; and, times 102 are listed in chronological order horizontally. The grid boxes 104 in the body of the program guide are preferably filled with text and/or graphics representing television shows and/or other programming available at the associated time on the associated channel.

Figure 4:
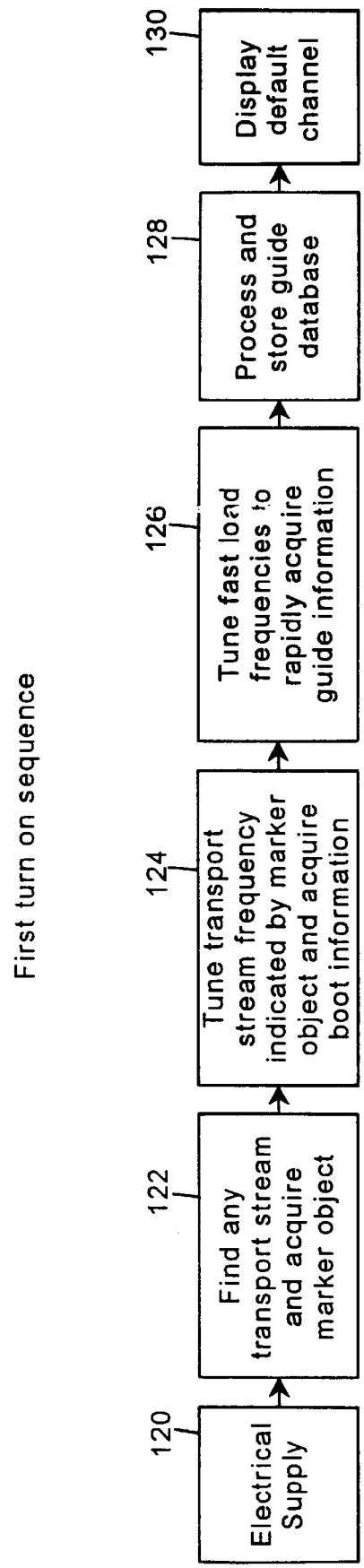
FIG. 4 is a timeline illustrating a start-up sequence for a typical receiver station.

When a receiver station (IRD) is first turned on, it must acquire the information necessary to construct the program guide. FIG. 4 shows a timeline illustrating a typical start-up sequence for an IRD. Once the IRD is connected to a properly oriented satellite antenna and an electrical supply (block 120), it locates a satellite transponder signal and starts to acquire the electronic program guide data by acquiring a market object (block 122). Program guide data (including system initialization information and/or program guide content) may be transmitted on one, some, or all transponders. System initialization information includes network definitions, DMA maps, local channel frequencies, how carousel bit masks are assigned, and other system information. Program guide content includes show descriptions, ratings, start times, durations, etc. Transponders may be scanned until the necessary program guide data is acquired or until boot information is acquired which unambiguously directs the receiver to time specific frequencies in order to acquire the necessary guide data (block 124). For example, the IRD may be directed to acquire fast load data (block 126). Preferably, in such an instance, the transponders are scanned in an agreed upon manner by the broadcaster, for example, starting with transponder 1 and proceeding sequentially to transponder 2, then 3, and so on to the highest number transponder and then back to transponder 1. Alternatively, a low data rate beacon may be transmitted on all transponders to identify what transponder the system program guide data can be acquired. This allows the broadcaster flexibility when selecting how to transmit the program guide data and guarantees no worse than a two-frequency timing process to "boot" an IRD. As the data is being acquired, it is processed and stored locally in the IRD (block 128). The IRD continues acquiring the data until it has received enough program data to fill its local program guide. Different IRDs contain different amounts of memory and/or feature sets for this purpose. Subsequently, a default channel may be displayed (block 130).

Figure 5:
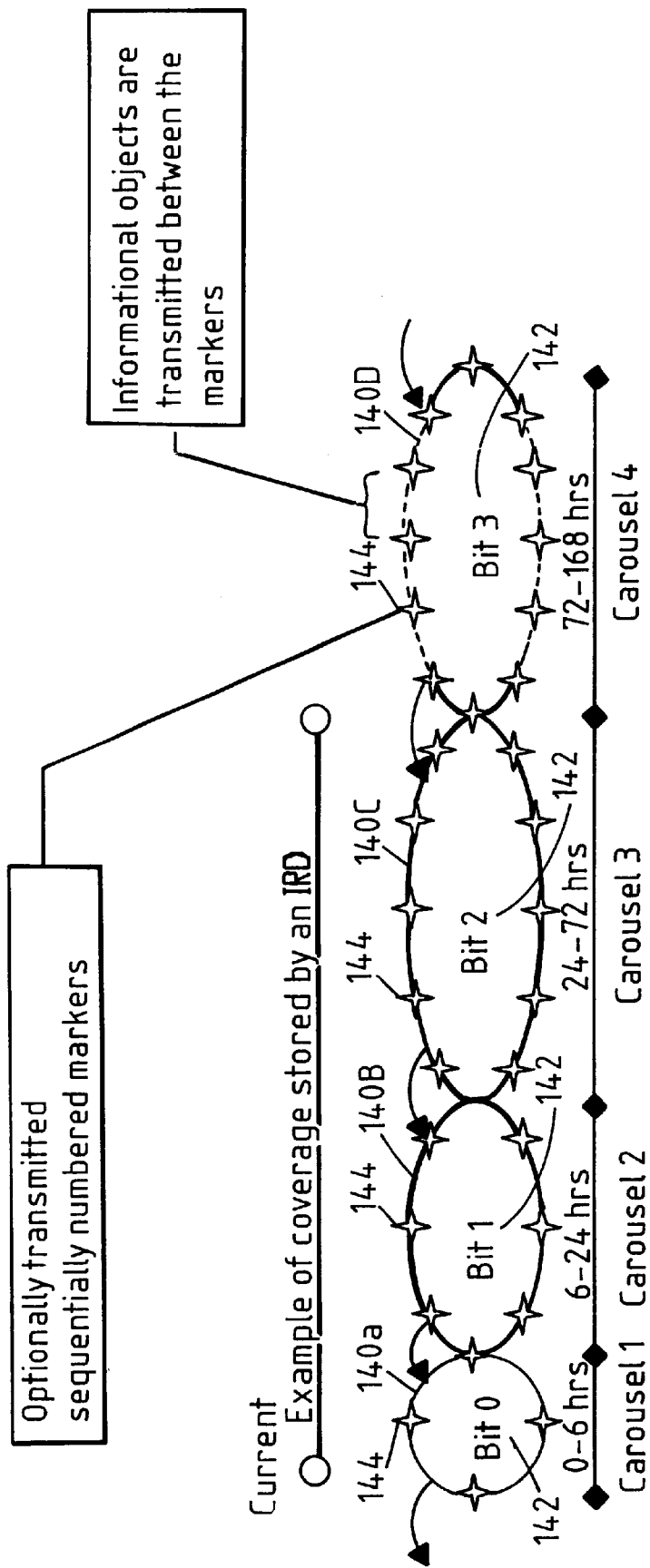
FIG. 5 is a timeline illustrating an example of the scheduling method of the present invention.

In order to acquire information in an efficient manner, the program guide data is preferably broadcast on multiple carousels 140 in parallel (see FIG. 5). A carousel 140 is a repeating broadcast of a data series. For example, a carousel 140 including objects A, B, C, and D may broadcast A, B, C, D, A, B, C, D, A, etc. The electronic program guide data corresponding to a particular period of interest may be distributed over several carousels. Preferably, carousels 140 are distinguished by the IRD by filtering incoming data on an identification number or bit mask 142. For example, FIG. 5 shows four carousels usings bits 0–3. Alternatively, carousels 140 may be distinguished by the IRD by filtering incoming data on a service channel ID (SCID). Preferably, carousels 140 broadcasting program guide data related to programming in the near future (i.e., a first section of time) are cycled more frequently than carousels 140 broadcasting program guide data related to programming further in the future (i.e., a second section of time). Preferably, each carousel broadcasts program guide data corresponding to a particular section of time relative to a reference time, where the reference time is preferably the current time. For example, a first carousel 140a may broadcast program guide data corresponding, e.g., to the next six hours of programming only, repeating every five minutes; while a second carousel 140b broadcasts program guide data related to programming from six to twenty-four hours from the current time, repeating every thirty minutes. Program guide data would enter the last carousel 140d when its start time becomes earlier than that carousel's 140d end time. Similarly, program guide data would exit the first carousel 140a when its end time becomes later than that carousel's 140d start time. Preferably, objects that overlap two or more carousels would exist only in the earlier carousel. Persons of ordinary skill in the art will readily appreciate that any number of carousels 140 covering any combination of time periods could be employed in the spirit of the present invention. To fully acquire a carousel's information, a full cycle of reading is needed without an interruption from a loss of satellite signal or a transponder change. For some carousels, a "List Object" may be broadcast so the receiver is informed of objects present in a carousel, allowing the receiver to verify full acquisition of a stream's contents. In some instances only high priority objects may be listed. These might, in turn, list directly or indirectly other objects in the carousel stream.

In the event that an IRD must change transponders (e.g., the user requests a channel on a different transponder), the acquisition of the program guide data will be interrupted. The program guide data is preferably broadcast simultaneously on all transponders and, after the IRD tunes to the new transponder, the same carousel(s) 140 are read to continue acquiring the program guide data. Markers 144 are preferably distributed periodically in the data of each carousel 140 to aide in synchronization when a transponder change occurs.

List objects enable an IRD to stay on a carousel only until all necessary objects are acquired. Several methods may be displayed. First, the list object may list all objects. As a result, if the frequency is changed, the IRD can continue to acquire and satisfy the total acquisition process. By predetermining all transmitted objects, the IRD need only remain on a particular carousel until the last object is acquired. Second, the list object may list only key, or high priority, objects. These objects could directly or indirectly list other objects in the carousel. Satisfactorily acquiring all listed objects aids the receiver in choosing to move on to the next carousel acquisition process. Third, the list objects may list channel objects. Channel objects in turn may have a unique identifier that lists schedule objects to the channel.

Preferably, the IRD acquires all the schedule objects needed to fully cover the time span for the carousel being monitored. The number of needed objects can be determined by considering the utility of some of the object types. For example, if only two schedule objects are to be acquired but a gap exists between them (as determined by comparing the start and end time of the first schedule object to that of the second schedule object), the IRD may acquire additional schedule objects.

Once all the schedule objects are acquired for the time span covered by a carousel, the program objects directly referenced by those schedule objects are then acquired (or verified as already acquired). Of course, the acquisition of the list object, channel objects, schedule objects and programs can be done in parallel, and the IRD can stop once all referenced objects or determined necessary objects are acquired.

After a transponder change or a satellite signal interruption occurs, the IRD locks onto the current transponder, and begins again acquiring the objects from the appropriate carousel(s). Upon receipt of the first marker, the IRD may continue to process the objects from the carousel until the same marker number is again acquired. Upon processing the same marker number twice, the IRD has confidence that the carousel has been fully consumed. Of course an IRD could be simultaneously acquiring two or more carousels, and each would follow the same procedure of reading the same numbered marker twice from each respective carousel.

Each object packet preferably starts with a network number that signifies a broadcast group, such as "DIRECTV® 101 degree services" or a local terrestrial DMA such as "Los Angeles, Calif.". An IRD is designed or configured to participate in one or more network groups, either by hardware design, software design or user preference. So, an IRD accepts object packets that match one of the configured network groups and rejects others.

An IRD desires program guide coverage of a particular time window either by hardware design, software design, or user preference. For example, an IRD may only have enough RAM to support a one week guide or the IRD S/W may only support a one week guide regardless of the amount of physical RAM present, or the user might specify interest in only a one week guide regardless of the IRD's native capabilities. After the time coverage desire is determined, one or more carousels overlay the desired time window and the IRD attempts to acquire those carousels and not any other carousels.

Each object packet preferably starts with a number identifying a network (e.g., ESPN), and a carousel mask. Preferably, each network is divided into the same number of carousels with the same time coverage divisions. Further, each carousel is preferably assigned a bit flag in the carousel mask. For example, $2^0$ for time from 0 to 6 hours, $2^1$ for time from 6 to 24 hours, $2^2$ for time from 24 to 72 hours, and $2^3$ for time from 72 to 168 hours. An IRD sets a local bit mask flag(s) corresponding to the carousel(s) it requires, and performs a logical operation using the local bit mask and each incoming carousel mask to determine which objects to save. For example, if an IRD requires carousels 0, 1, and 2, it would set the $2^0$ bit, $2^1$ bit, and the $2^2$ bit. The IRD could acquire the three carousels in series by sequencing through the bits; the IRD could acquire the three carousels in parallel by setting all there bits two at a time; or the IRD could perform some combination of serial and parallel as resources dictated (e.g., set n bits at a time, where n>2, because that's as fast as it can handle storing the objects).

When acquiring carousels in a serial fashion, two carousels are preferably acquired in parallel. For example, if six carousels are to be read, the IRD may first acquire $2^0+2^1$, then, $2^1+2^2$, then, $2^2+2^3$, then, $2^3+2^4$, then, $2^4+2^5$. Subsequently, the IRD could linger on monitoring $2^5$, or the IRD could determine when a "hole" appears. Two carousel monitoring is beneficial because, as time advances, objects may jump carousels, moving from carousel $2^i$ to carousel $2^i$. If, at that moment, the IRD went from monitoring $2^i$ to $2^i$, that IRD may never acquire the objects which had just made the carousel jump.

Figure 6:
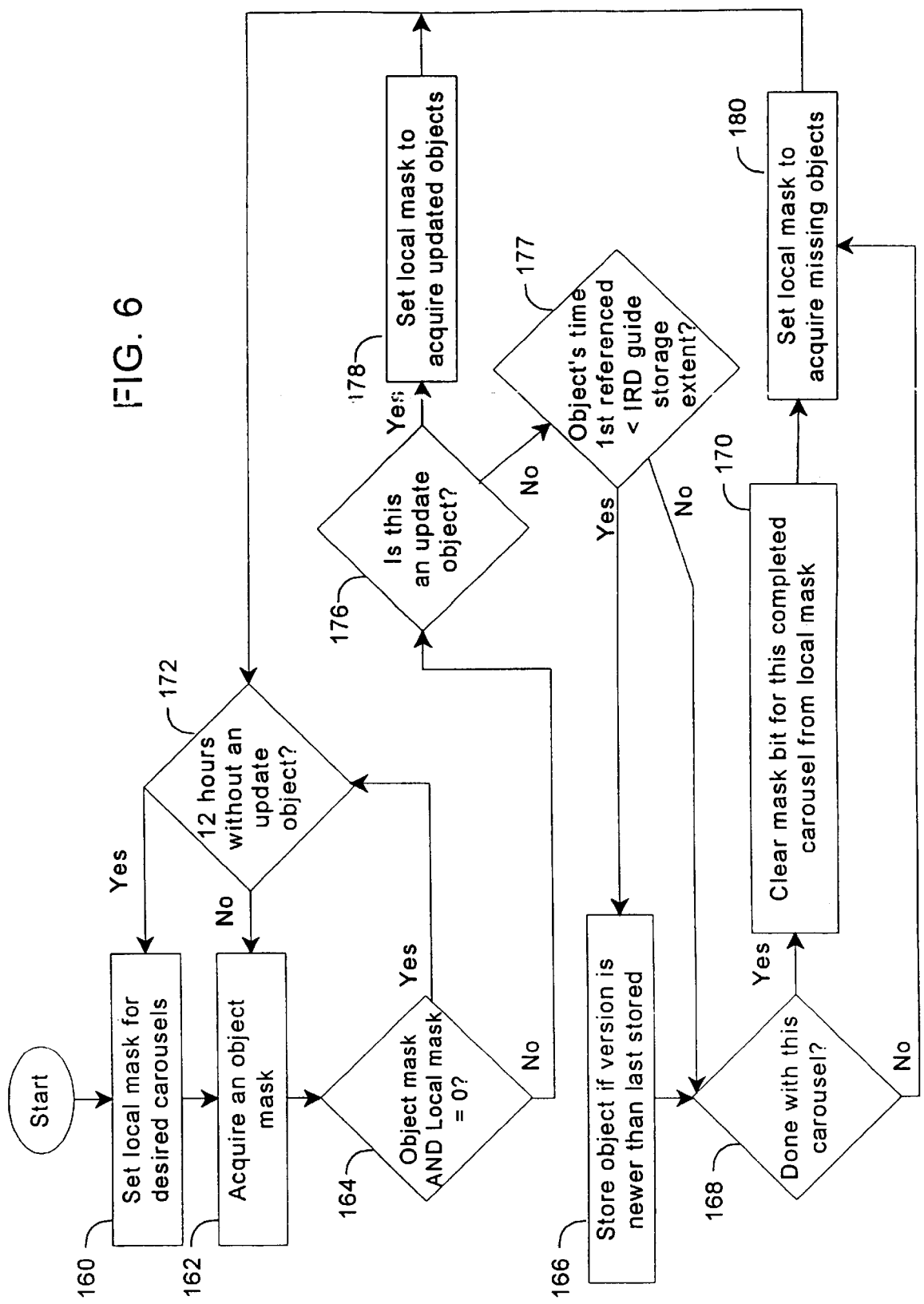
FIG. 6 is a flowchart illustrating an embodiment of a method to acquire packets.

A flowchart of a program that can be implemented by the local receiver unit 36 (e.g., an IRD) to acquire packets in accordance with the teachings of the present invention is illustrated in FIG. 6. The programmed steps may be performed by a control circuit such as a microprocessor 58. Once the program is initiated the control circuit preferably sets the local bit mask flag(s) to a non-zero value corresponding to the carousel(s) it requires (block 160). Bit positions are preferably defined in a separate object that the IRD reads during an initialization stage. By predefined convention of the program guide object formats, the IRD processes a table that specifies both the time windows along with the associated bit positions. Accordingly, the IRD knows which carousels correspond with which bit positions.

Subsequently, the control circuit acquires an incoming object's mask (block 162). To determine if the incoming object is to be acquired, the control circuit preferably compares the object's mask to the local mask by logically ANDing the two masks together (block 164). If the result of the AND function is zero, the control circuit checks if a predetermined period of time without receiving an update object has elapsed (block 172). If the time has not elapsed, the control circuit acquires another incoming object's carousel mask (block 162). If the time has elapsed, the control circuit preferably sets the local mask to re-acquire all the desired carousels because they may be obsolete (block 160). The control circuit may persist with a bit or bits set to allow it to receive what it considers the newest (furthest in the future it stores) information as it becomes available and old information expires. Alternatively, the control circuit could periodically update program guide information.

If the result of the AND function of block 164 is non-zero, the IRD determines if the object is an update object (block 176). Update objects may be used to inform an IRD of objects which must be reacquired due to a version change. Update objects may contain a list of object numbers that have been recently updated (e.g., within the last twenty-four hours) along with each objects corresponding version number. Update objects may have a carousel mask set to 0xFF to force the IRD to acquire it. The control circuit determines if an object is an update by comparing the value of an object type field to a predefined object code indicative of the update object (e.g., object_type=0x81). If the object is not an update object, it is tested to determine if the time the object is first referenced is less than the IRD's guide storage extent (block 177). In addition to the object mask, objects are preferably sent with a time the object is first referenced. If the first referenced time for the object is less than the latest time, then the object is stored if it is a newer version (block 166). An object's time first referenced value enables an IRD to select some, but not all, of a carousel's objects for storage. If an object's time first referenced value falls within the total time extent desired by an IRD, then that object ought to be stored. For example, if the current is time Mar. 10, 1999 10:00, then the 3.5 day IRD coverage wants objects that are somehow referenced before or on Mar. 13, 1999 22:00. Any object with a time first referenced value that is $\leq$ Mar. 13, 1999 22:00 is stored. If the carousel covers additional time, the time first referenced value allows the IRD to store a partial time coverage of that carousel.

Objects with updates may be transmitted immediately, in an asynchronous manner, without waiting for its regular order in the carousel. This permits those IRDs that are acquiring a carousel only until a marker number repeats twice to get the updated version before the carousel is 'finished'.

When an object is acquired with a carousel bit mask of all ones, then the IRD must determine whether the object is in the desired time window using other means. One method is for the IRD to only keep the updated object if an older version already existed. This works because the IRD will eventually encounter the newer version of the object as it completes acquisition of the desired carousels. Predicated on this is the approach of only sending the latest version of any object at its moment of transmission. Another approach is to utilize a secondary means of establishing time relevance on objects besides using the carousel bit mask. When the carousel bit mask is all ones, a secondary field gives the object's earliest time relevance to the IRD. If this time is within the IRD's desired time window, then the IRD could determine whether the updated object is of interest before saving it. In this manner, the IRD need not wait until the carousel completes a cycle to supply the latest version of an object.

Returning to FIG. 6, if at block 176 the object is determined to be an update object, the control circuit sets one or more bits in the local mask to acquire updated objects (block 178). The control circuit may make this determination by comparing the list of object numbers and associated version numbers contained in the update objects against the object numbers and associated version numbers in this particular IRD's database. Subsequently, the bits of the local mask may be set to correspond to the carousels where the updated objects may be found. Updated objects may be found in the same carousel where they were originally broadcast or on a special updated object carousel (e.g., carousel number eight may contain all objects that have been updated within the last twenty-four hours).

After storing (block 166) the control circuit determines if all of the objects the IRD requires from that carousel have been acquired (e.g., if the same marker number is observed twice or by referencing a stored list) (block 168). For example, the control circuit could check if all of the time slots for a particular network and time period have been filled. If all of the objects the IRD requires from that carousel have been acquired, the control circuit clears that bit in the local mask so that subsequent broadcasts of the same packets are ignored (block 170).

Subsequently, the IRD sets the local mask to acquire missing objects (block 180). Missing objects are objects which are now needed, but are not in the IRD's database. Typically, this condition is due to the passage of time. For example, every half hour, program guide objects associated with the past are discarded, and program guide objects associated with the end of the guide (e.g., six hours in the future) are required to fill out the electronic program guide. Once local mask bits are set to acquire updated and/or missing objects (blocks 178 and/or 180), the control circuit continues to check the twelve hour timer (block 172) (discussed in detail above) and acquire object masks.

In the preferred embodiment, update objects may be used to inform an IRD of objects which must be reacquired do to a version change. Preferably, update objects contain a list of object numbers that have been recently updated (e.g., within the last twenty four hours) along with each objects corresponding version number. Preferably, update objects have a carousel mask set to 0xFF to force the IRD to acquire it. Accordingly, for all objects with a carousel mask equal to 0xFF (as determined by block 174), the control circuit determines if the object is an update object at block 176. Preferably, the control circuit determines if an object is an update object by comparing the value of a object type field to a predefined object code indicative of a update object (e.g., object_type=0x81). If the object is not an update object, it is stored at block 166 (as discussed in detail above). However, if the object is an update object, the control circuit may set one or more bits in the local mask to acquire updated objects (step 178). The control circuit may make this determination by comparing the list of object numbers and associated version numbers contained in the update object contains against the object numbers and associated version numbers in this particular IRD's database. Subsequently, the bits of the local mask may be set that correspond to the carousels where the updated objects may be found. In the preferred embodiment, updated objects may be found in the same carousel where they were originally broadcast or on a special updated object carousel (e.g., carousel number eight may contain all object that have been updated with the last twenty four hours).

In summary, persons of ordinary skill in the art will readily appreciate that a carousel bit mask system and method have been provided. Users of systems implementing the teachings of the present invention can enjoy flexible acquisition of data, increased start-up speed, decreased latency, and/or fewer missed messages.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for selectively storing an electronic program guide object in a satellite broadcast system, the method comprising the steps of:

setting a bit in a local mask indicative of a first carousel of electronic program guide information that is repeatedly broadcast with a first periodicity, wherein the local mask further includes a clear bit indicative of a second carousel of electronic program guide information that is repeatedly broadcast with a second periodicity different than the first periodicity;

acquiring an object mask associated with the electronic program guide object;

comparing the object mask to the local mask; and storing the electronic program guide object if the electronic program guide object is associated with the first carousel of electronic program guide information.

2. A method as defined in claim 1, further comprising;

comparing the object mask to a predefined constant; and storing the program guide object if the object mask is equal to the predefined constant.

3. A method as defined in claim 2, wherein the predefined constant is equal to a binary number comprising all ones.

4. A method as defined in claim 1, further comprising;

receiving a marker;

comparing the received marker to a predefined marker; and clearing the bit in the local mask if the received marker is equal to the predefined marker.

5. A method as defined in claim 1, further comprising determining if a received object is an update object.

6. A method as defined in claim 5, wherein setting the bit in the local mask is performed in response to determining that the received object is an update object.

7. A method as defined in claim 1, further comprising determining if a predefined time period has elapsed since last receiving an update object.

8. A method as defined in claim 7, wherein setting the bit in the local mask is performed in response to determining that the predefined time period has elapsed.

9. A method as defined in claim 1, wherein the broadcast system comprises a direct-to-home satellite system.

10. A method as defined in claim 1, wherein comparing the object mask to the local mask comprises a logical AND operation.

11. An apparatus for selectively storing an electronic program guide object in a satellite television system comprising:

a satellite signal receiver for receiving the electronic program guide object from one of a first carousel of electronic program guide information that repeatedly broadcasts a first set of electronic program guide information with a first periodicity and a second carousel of electronic program guide information that repeatedly broadcasts a second set of electronic program guide information with a second periodicity;

a memory for storing the electronic program guide object; and a control circuit operatively coupled to the receiver and the memory for determining if an object mask associated with the electronic program guide object is indicative of one of the first and second carousels of electronic program guide information, the control circuit causing the memory to store the electronic program guide object if the object mask is indicative of one of the first and second carousels of electronic program guide information.

12. An apparatus as defined in claim 11, wherein the control circuit is further adapted to compare the object mask to a predefined constant, the control circuit causing the memory to store the electronic program guide object if the object mask is equal to the predefined constant.

13. An apparatus as defined in claim 11, wherein the control circuit is further adapted to compare a marker received by the satellite signal receiver to a predefined marker, wherein the marker is indicative of a particular point in time associated with the carousel of electronic program guide information.

14. An apparatus as defined in claim 11, wherein the control circuit is further adapted to determine if an update object is received by the satellite signal receiver.

15. A method of transmitting electronic program guide information comprising;

provoiding a first carousel of electronic program guide information corresponding to a first section of time relative to a reference time, wherein the first carousel of electronic program guide information comprises first program data;

providing a second carousel of electronic program guide information corresponding to a second section of time relative to the reference time, wherein the second carousel of electronic program guide information comprises second program data;

cycling the first carousel at a first rate, wherein the first program data is repeatedly broadcast at a first periodicity; and cycling the second carousel at a second rate different from the first rate, wherein the second program data is repeatedly broadcast at a second periodicity different from the first periodicity.

16. A method as defined in claim 15, wherein the referenced time is substantially equal to the current time.

* * * * *